US005383390A

United States Patent [19]

Lukich

[11] Patent Number: 5,383,390

[45] Date of Patent: Jan. 24, 1995

[54] MULTI-VARIABLE CONTROL OF MULTI-DEGREE OF FREEDOM LINKAGES

[75] Inventor: Michael S. Lukich, Peoria, Ill.

[73] Assignee: Caterpillar Inc., Peoria, Ill.

[21] Appl. No.: 82,644

[22] Filed: Sep. 23, 1993

[51] Int. Cl.⁶ ........................ F15B 13/16; F16D 31/02

[52] U.S. Cl. ........................ 91/361; 91/513; 91/517; 91/459; 60/426; 60/427

[58] Field of Search ........................ 91/361, 363 R, 459, 91/513, 517; 60/420, 426, 427, 433

[56] References Cited

U.S. PATENT DOCUMENTS

| | | | |
|---|---|---|---|
| 3,789,739 | 2/1974 | Krehbiel et al. | 91/358 |
| 3,892,079 | 7/1975 | Hirano et al. | 37/56 |
| 4,015,729 | 4/1977 | Parquet et al. | 214/762 |
| 4,109,812 | 8/1978 | Adams et al. | 214/762 |
| 4,166,506 | 9/1979 | Tezuka et al. | 172/4.5 |
| 4,358,989 | 11/1982 | Tordenmalm | 91/361 |
| 4,516,469 | 5/1985 | Sato et al. | 91/513 X |
| 4,552,503 | 11/1985 | Mouri et al. | 414/687 |
| 4,643,074 | 2/1987 | Gunda et al. | 91/361 |
| 4,844,685 | 7/1989 | Sagaser | 414/700 |
| 4,893,981 | 1/1990 | Yoshinada et al. | 414/5 |
| 5,012,722 | 5/1991 | McCormick | 91/361 |
| 5,062,264 | 11/1991 | Frenette et al. | 91/361 X |
| 5,189,940 | 3/1993 | Hosseini et al. | 91/361 |
| 5,195,864 | 3/1993 | Drake et al. | 414/699 |
| 5,201,177 | 4/1993 | Kim | 91/513 X |
| 5,214,916 | 6/1993 | Lukich | 60/433 X |

FOREIGN PATENT DOCUMENTS 2225127 5/1990 United Kingdom .

*Primary Examiner*—John T. Kwon
*Assistant Examiner*—Hoang Nguyen
*Attorney, Agent, or Firm*—James R. Yee

[57] ABSTRACT

The present invention provides an apparatus for controllably actuating a work implement. The work implement includes at least a first linkage and a second linkage. The apparatus produces a control signal, senses the position and velocity of the first and second linkages and responsively produces position and velocity signals. The apparatus responsively produces a command signal as a function of the control signal and the position and velocity signals. The command signal controls actuation of the first linkage such that dynamic coupling between the first and second linkages is minimized.

29 Claims, 10 Drawing Sheets

402

MULTI-VARIABLE CONTROL OF MULTI-DEGREE OF FREEDOM LINKAGES

DESCRIPTION

1. Technical Field

This invention relates generally to a control system for a work implement and more particularly to a control system for a work implement having a plurality of multi-degree of freedom linkages.

2. Background Art

Conventional earth-moving machinery use hydraulic work implements having a plurality of multi-degree of freedom linkages. For example, a front end loader utilizes a work implement for digging, loading and dumping a bucket. Typically, the work implement includes at least two linkages, a boom and a bucket. Each linkage is actuated by at least one hydraulic cylinder for controlled movement.

The hydraulic excavator (HE) is another example. The HE's work implement typically has three linkages: a boom, a stick, and a bucket. Furthermore, rotary motion of the implement itself is provided hydraulically either by rotation of the implement about a pivot point or rotation of the HE's cab.

For both vehicles, actuation of the hydraulic cylinders is typically provided through movement of a series of mechanical levers. Each mechanical lever is mechanically coupled to a hydraulic directional control valve which controllably provides a flow of hydraulic fluid to the respective hydraulic cylinder(s). Normally, each circuit would contain at least one directional control valve. The directional control valve may be either directly coupled to a control lever or hydraulically coupled through a hydraulic pilot system.

An operator, in order to affect movement of a particular linkage would controllably operate one of the control levers. Movement of a control lever along a particular axis would result in responsive movement of a specified linkage. For example on a HE, four separate levers may be provided, each movable along a single axis. Movement of a particular lever may effect movement of a respective linkage. Or levers movable along two perpendicular axes may provide control of two linkages.

More recently, some systems have employed electronic joysticks. These joysticks produce electronic signals in response to handle movement. A controller, typically microprocessor based, interprets the electronic signals and controllably actuates an electrohydraulic direction control valve or a pilot control valve for providing hydraulic fluid flow to the cylinders.

In such systems in order to controllably position or move the endpoint of the implement, the operator would have to simultaneously operate at least two control levers. In order to provide a high degree of accuracy, a highly experienced operator is required.

In order to reduce the required skill level of the operator, effort has gone into automating or semi-automating the work cycle or portions of the work cycle of the work implement. One of the most desired features is linear motion control. In a system as described above, in order to achieve linear movement, the operator would have to simultaneously operate at least two control levers of the hydraulic excavator. In an automated or semi-automated system, the operator would simply place the work implement in the proper mode and actuate a single control lever. In response the controller would generate the required signals to the control valves to provide the desired movement.

However, in any of the systems described above, manual, automatic or semi-automatic, operation of a plurality of linkages has substantial dynamic effects. Heretofore, none of the systems described have compensated for these effects.

The dynamic effects are a result of the oil-mass resonances associated with each implement circuit. The resonant frequency of each circuit is different and varies as a function of the forces exerted on each linkage and the oil column lengths of the individual circuits (as defined by the linear extension of the respective cylinder and line volumes). The forces exerted on the linkage are a function of the load on the implement and the individual forces exerted on the linkage from each of the hydraulic cylinders.

As mentioned above, each resonant frequency is dynamic, i.e., it continuously varies. The problem lies in the fact that as each hydraulic cylinder is extended or retracted, the force exerted by the respective cylinder on the linkage may force the hydraulic cylinders corresponding to the other circuits into an oscillatory mode resulting in a severe degradation of desired path accuracy. This is known as dynamic coupling or "cross-talk" among the implement circuits. Each hydraulic circuit has the potential for adversely exciting the other circuits. As a result, whenever one hydraulic circuit is being utilized on a multi linkage implement, the potential for cross-talk and a degradation in system response accuracy exists.

The present invention is directed to overcoming one or more of the problems, as set forth above.

DISCLOSURE OF THE INVENTION

In one aspect of the present invention an apparatus for controllably actuating a work implement is provided. The work implement has at least a first linkage and a second linkage. The apparatus produces a control signal and senses the position and velocity of the first and second linkages. The apparatus produces a command signal as a function of the control signal and the position and velocity signals. The command signal controls actuation of the first linkage such that cross-talk between the first and second linkages is minimized.

BEST MODE FOR CARRYING OUT THE INVENTION

Figure 1:
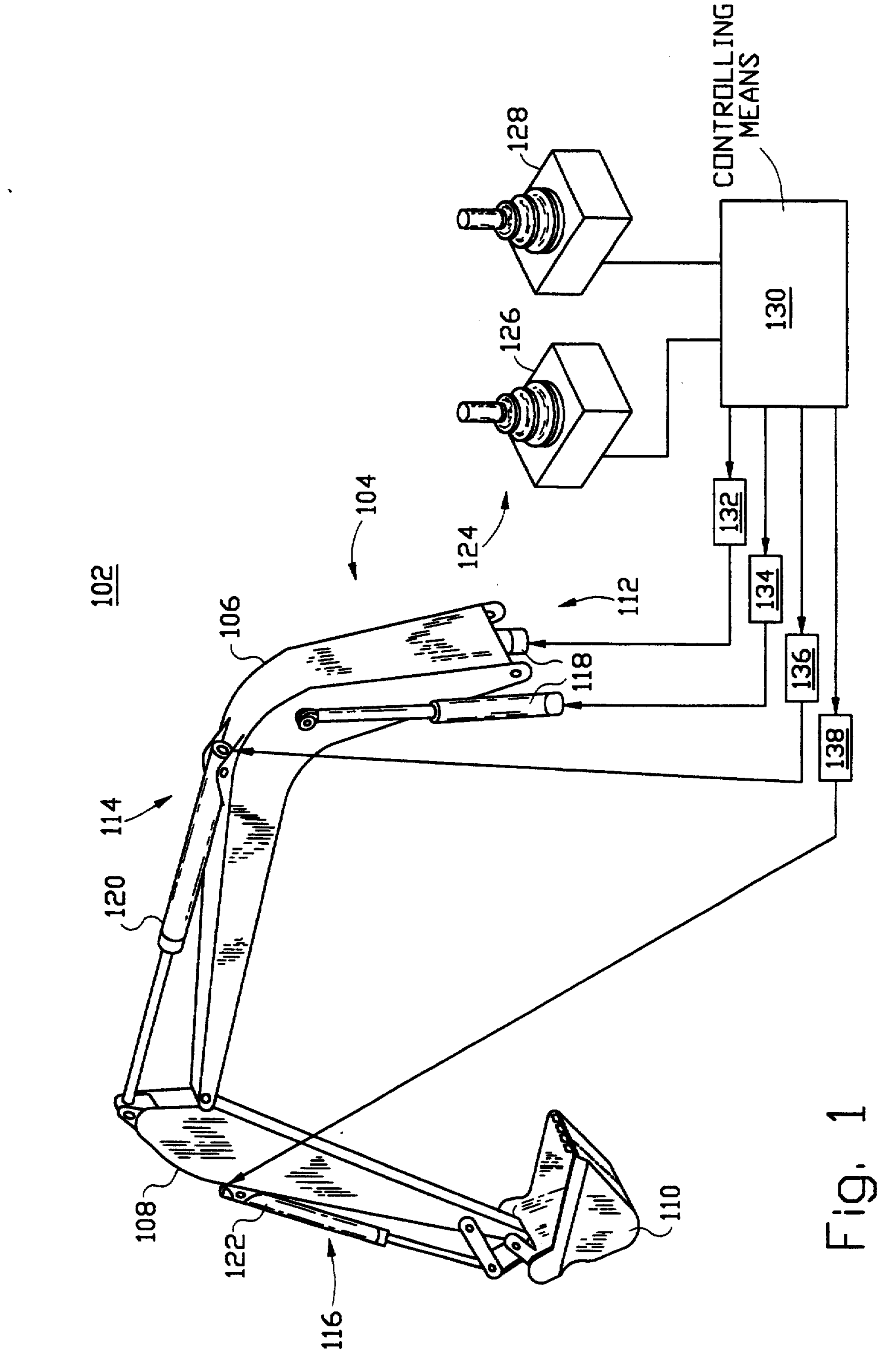
FIG. 1 is a stylized representation of a work implement having first, second and third linkages, respective actuating means, and a controlling means, according to an embodiment of the present invention.

With reference to FIG. 1, the present invention or apparatus 102 is adapted to control the work implement 104 of an earthmoving vehicle. The work implement 104 shown is that of a hydraulic excavator. However, the present invention is applicable to the work implements of various other earthmoving vehicles, e.g., a front end loader or motorgrader.

The work implement 104 of the hydraulic excavator has first, second and third linkages 106,108,110 (the boom, stick and bucket). However as stated above, the present invention provides advantages for various other arrangements, for example, work implements having as few as two linkages and work implements having as many as N linkages. The following discussion is concerned with a hydraulic excavator, i.e., a work implement having 3 linkages. However, it is understood that the present invention is equally applicable to a work implement having as few as 2 and as many as N linkages.

A means 124 produces at least one control signal. In one embodiment, the control signal producing means 124 includes first and second control handles 126,128. In the preferred embodiment, the control handles 126,128 are electronic joysticks which generate electronic signals in response to movement of the joysticks along or about suitable axes.

Figure 2:
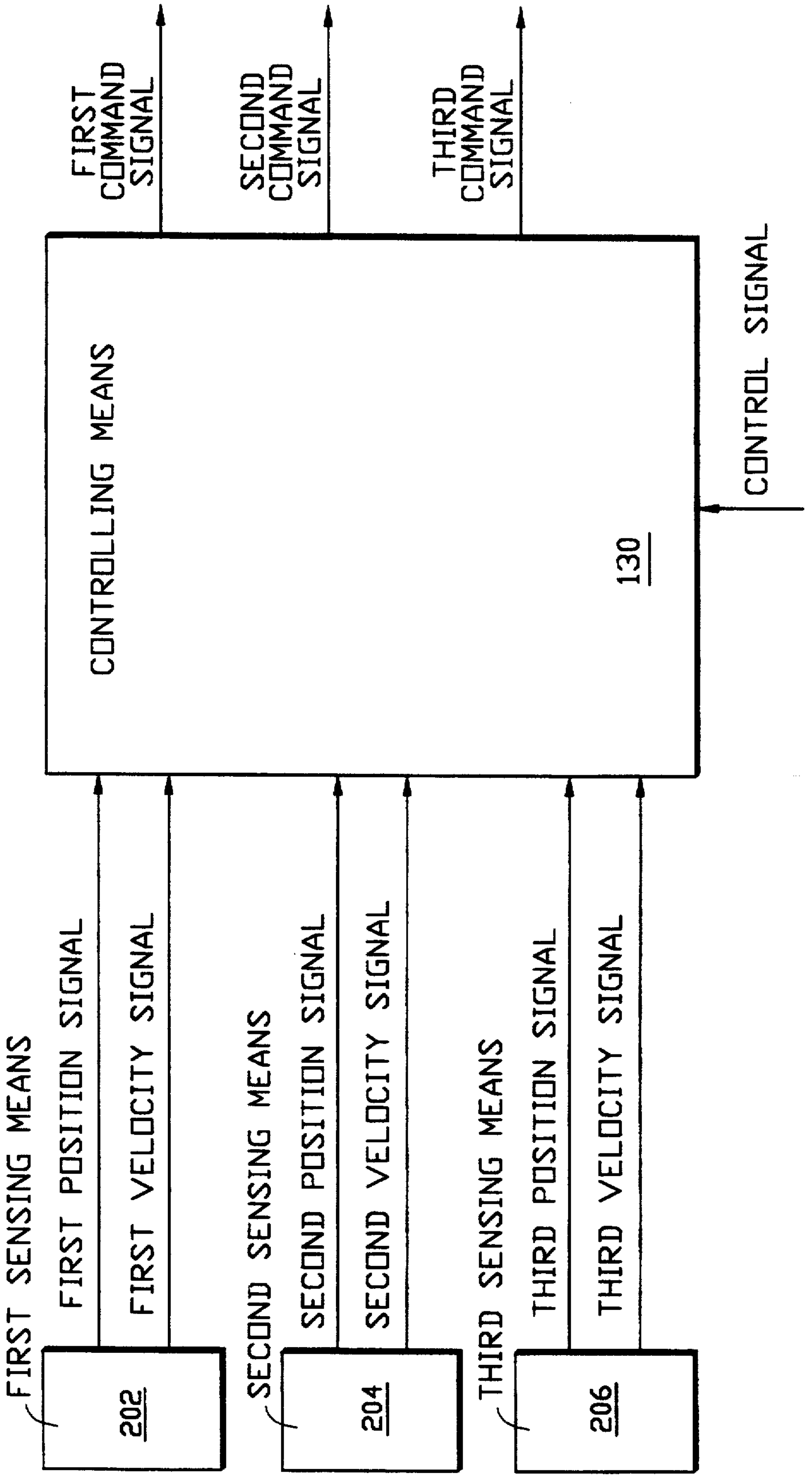
FIG. 2 is a block diagram of the controlling means of FIG. 1 and position and velocity input sensors.

With reference to FIGS. 1 and 2, a controlling means 130 receives the control signal(s), the first, second, and third position signals, the first, second, and third velocity signals and produces a first command signal ($C_1$) as a function of the control signal(s), the first, second, and third position signals and the first, second, and third velocity signals.

The controlling means 130 also produces a second command signal ($C_2$) as a function of the control signal(s), the first, second, and third position signals and the first, second, and third velocity signals and produces a third command signal ($C_3$) as a function of the control signal(s), the first, second, and third position signals and the first, second, and third velocity signals.

With reference to FIG. 2, a means 202 senses the position and velocity of the first linkage 106 and responsively produces a first position signal and a first velocity signal.

A means 204 senses the position and velocity of the second linkage 108 and responsively produces a second position signal and a second velocity signal.

A means 206 senses the position and velocity of the third linkage 110 and responsively produces a third position signal and a third velocity signal.

The means 202,204,206 may sense either linear and angular positions and velocities.

In a first embodiment, each position and velocity sensing means 202,204,206 includes a RF linear position sensor. The RF position sensor senses the linear extension of the cylinders. In one embodiment, the RF sensor also senses the linear velocity of the cylinder. In another embodiment, a separate velocity sensor, for example, a DC rotary generator connected to the cylinder which generates an electrical signal responsive to the speed of rotation. In still another embodiment, the controlling means 130 estimates the individual velocities as the derivative of the position signals.

In a second embodiment, each position and velocity sensing means 202,204,206 includes a rotary encoder which generates signals indicated of the movement of the individual linkages 106,108,110 about a respective pivot point.

A means 112 receives the first command signal ($C_1$) and responsively actuates the first linkage 106 as a function thereof.

A means 114 receives the first command signal ($C_2$) and responsively actuates the second linkage 108 as a function thereof.

A means 116 receives the first command signal ($C_3$) and responsively actuates the third linkage 110 as a function thereof.

In the preferred embodiment, the first, second, and third actuating means 112,114,116 includes two hydraulic cylinders 118, one hydraulic cylinder 120 and one hydraulic cylinder 122, respectively.

The first command signal is adapted to minimize the cross-talk between the first actuating means 112 and the second and third linkages 108,110 and actuating means 114,116.

The second command signal is adapted to minimize the cross-talk between the second actuating means 114 and the first and third linkages 106,110 and actuating means 112,116.

The third command signal is adapted to minimize the cross-talk between the third actuating means 116 and the first and second linkages 106,108 and actuating means 112,114.

The term "cross-talk" or dynamic coupling refers to the effect actuation of one hydraulic circuit has on the other hydraulic circuits. Each hydraulic circuit (including the linkage and the respective cylinder) has a dynamic oil-mass resonant frequency. As the linkages of the work implement are moved relative to one another, the dynamic behavior of each linkage, i.e., the oil-mass resonant frequency, changes. Frequently, the oil mass resonsant frequencies of the linkages overlap. The inertial load, e.g., material in the bucket, also affects the individual oil-mass resonance frequencies and provides a forcing function for excitation. The present invention compensates for the cross-talk between the hydraulic circuits thereby reducing the dynamic coupling.

Figure 5:
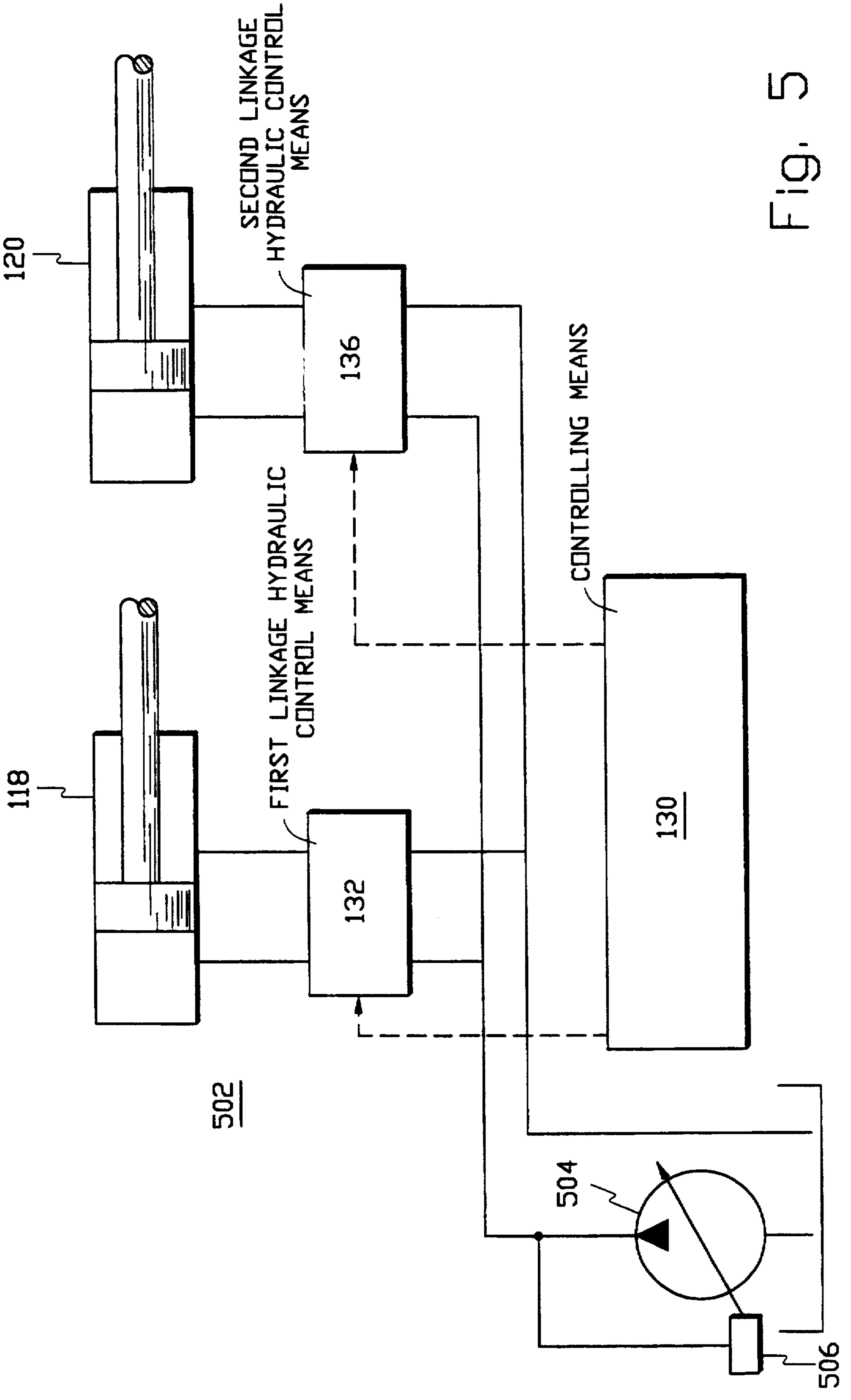
FIG. 5 is a stylized representation of a serial hydraulic circuit and the controlling means of FIG. 1, according to am embodiment of the present invention.

With reference to FIG. 5 in one embodiment, the actuating means 112,114 are parallelly connected in a hydraulic circuit 502. A pump 504 provides pressurized hydraulic fluid to the actuating means 112,114. A feedback control valve 506 provides load compensation to the pump 504.

Figure 6:
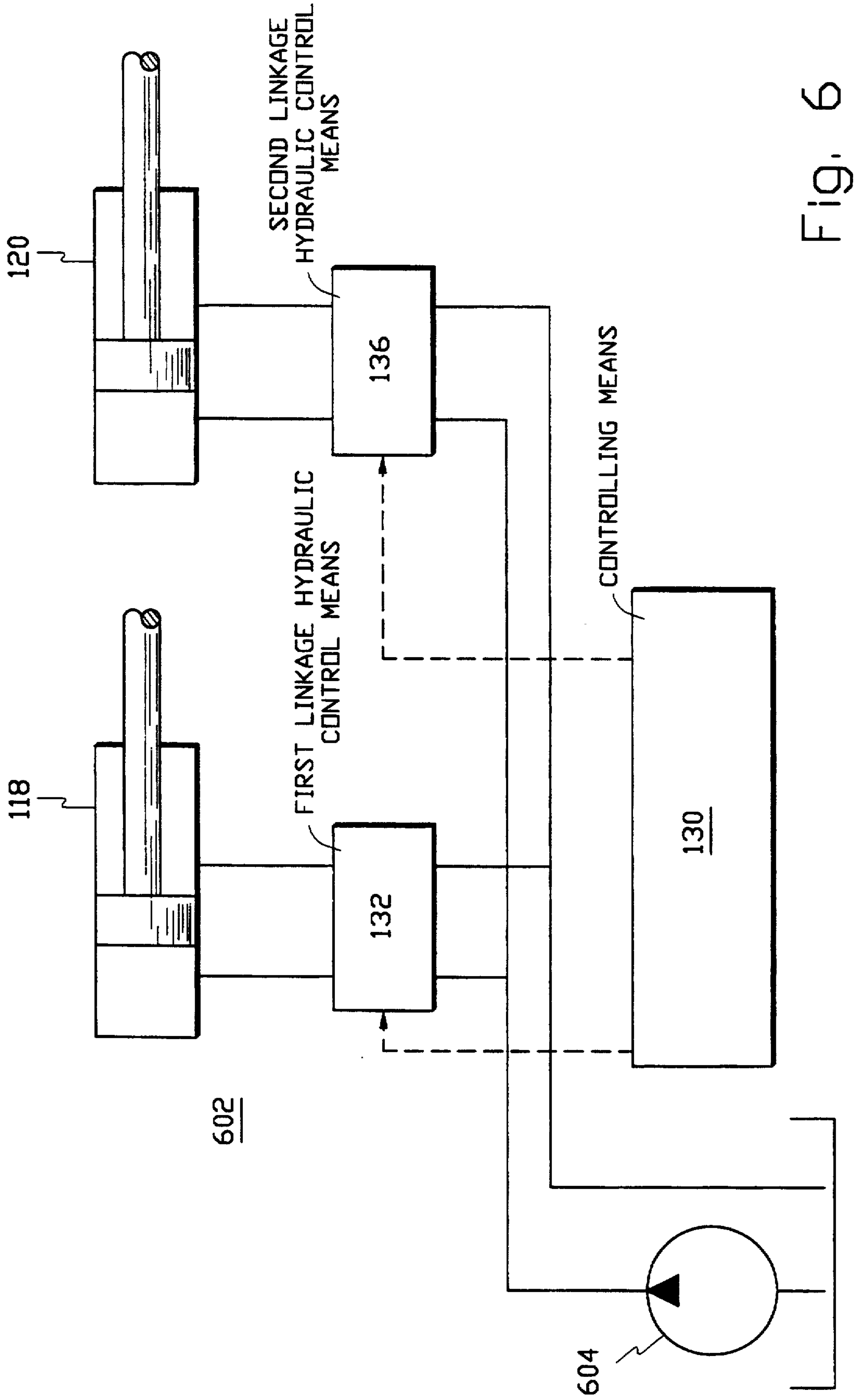
FIG. 6 is a stylized representation of a parallel hydraulic circuit and the controlling means of FIG. 1, according to am embodiment of the present invention.

With reference to FIG. 6, in another embodiment, the actuating means 112,114 are serially connected in a hydraulic circuit 602. A pump 602 (shown here as being uncompensated) provides pressurized hydraulic fluid to the actuating means 112,114.

Figure 7:
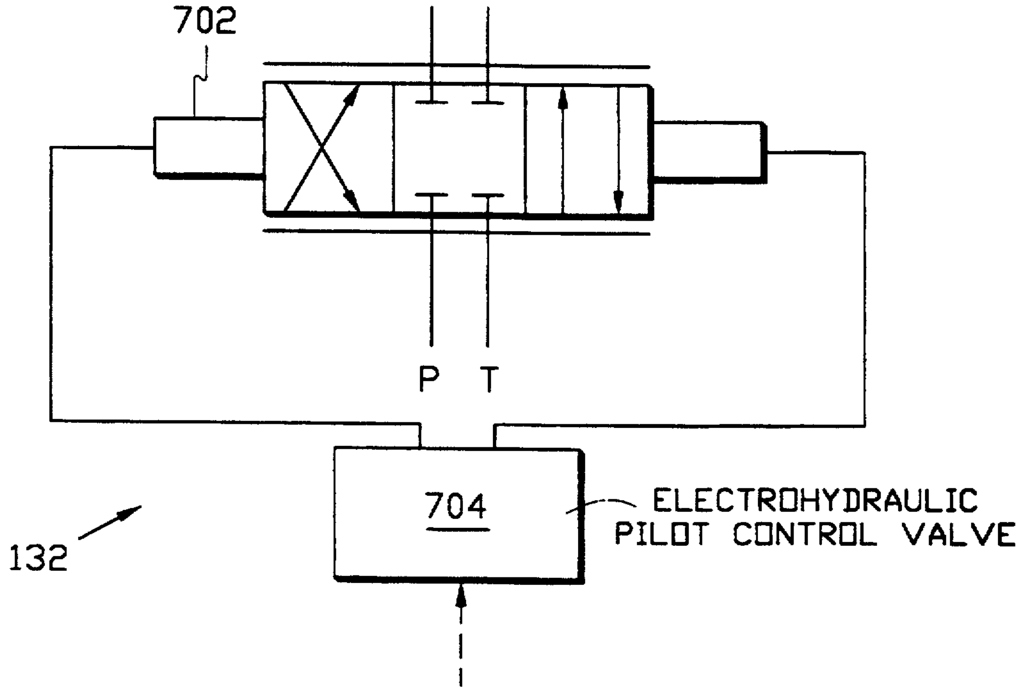
FIG. 7 is a stylized representation of one of the actuating means of FIG. 1, including an open center directional control valve and an electrohydraulic pilot valve.

With reference to FIG. 7 in one embodiment, each actuating means 112,114,116 includes an open center directional control valve 902 and a pilot control valve 704.

Figure 8:
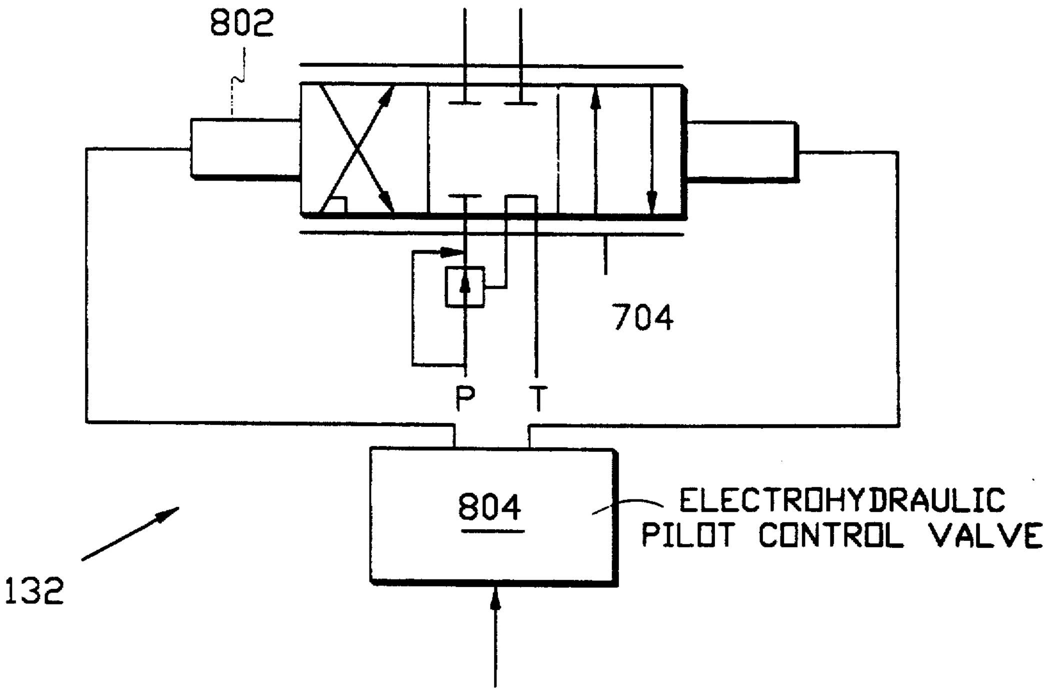
FIG. 8 is a stylized representation of one of the actuating means of FIG. 1, including a closed center pressure compensated directional control valve and an electrohydraulic pilot valve.

With reference to FIG. 8 in another embodiment, each actuating means 112,114,116 includes a closed center pressure compensated directional control valve 802 and a pilot control valve 804.

Figure 9:
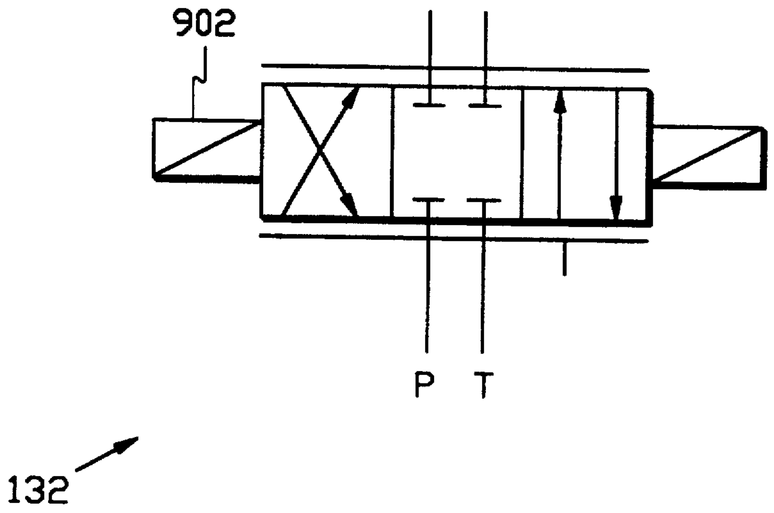
FIG. 9 is a stylized representation of one of the actuating means of FIG. 1, including an electrohydraulic open center directional control valve; and, FIG. 10 is a stylized representation of one of the actuating means of FIG. 1, including an electrohydraulic closed center directional control valve.

With reference to FIG. 9 in still another embodiment, each actuating means 112,114,116 includes an electrohydraulic open center directional control valve 902.

Figure 10:
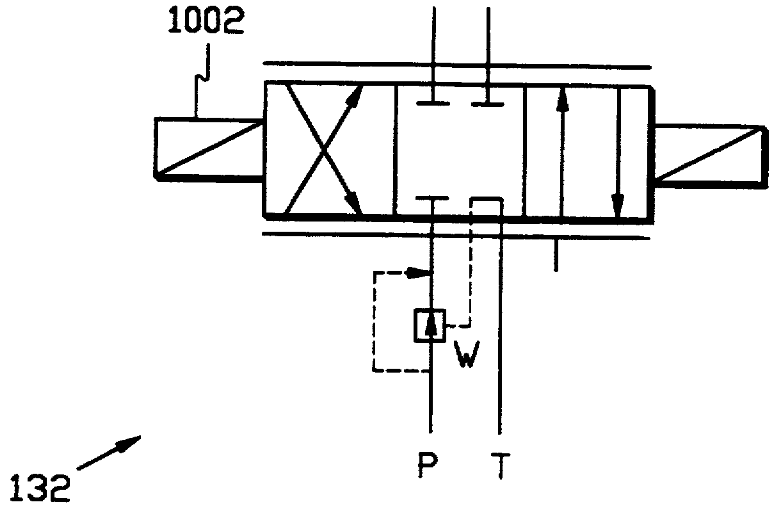

With reference to FIG. 10 in an alternate embodiment, each actuating means 112,114,116 includes an electrohydraulic closed center pressure compensated directional control valve 1002.

The hydraulic circuits discussed and shown in FIGS. 5–10 and variations thereof are well-known in the art. The embodiments of the hydraulic circuits described with regard to FIGS. 5–10 are exemplary only. The present invention is expressly not limited to such arrangements and is equally applicable to other arrangements, for example, hybrid serial and parallel hydraulic circuits or circuits containing variations or hybrids of the directional control valves discussed above.

In the preferred embodiment, the controlling means 130 includes a controller 208. Preferably, the controller 208 is a digital controller which receives the sensor information and controllably operates the individual actuating means. Preferably, the controller 210 is microprocessor based. One suitable microprocessor is MC68332 which is available from Motorola Corp. of Schaumburg, Ill.

Figure 3:
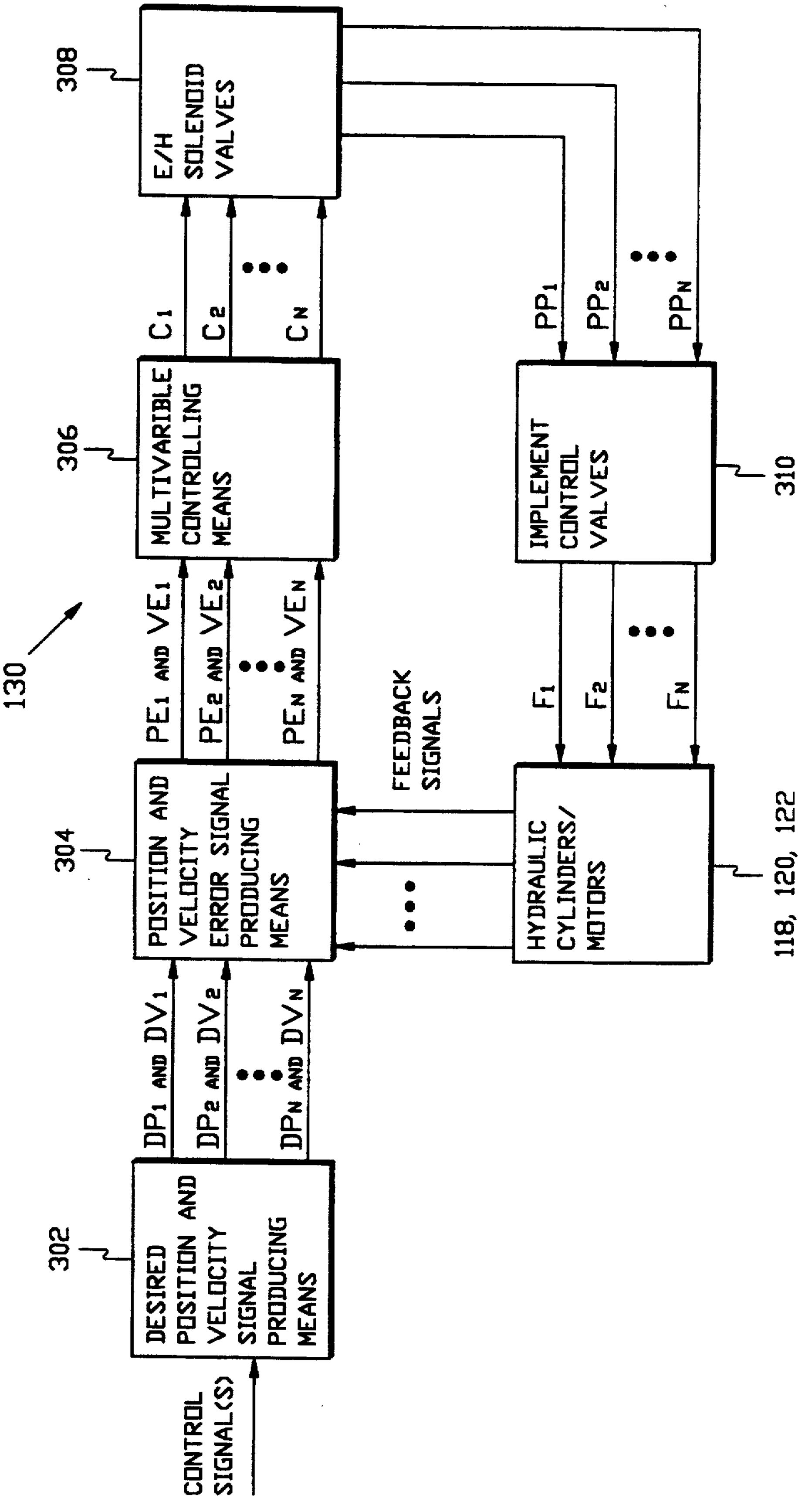
FIG. 3 is a detailed block diagram of the controlling means of FIG. 1 including a multivariable controlling means.

With reference to FIG. 3, the controlling means 130 includes a means 302 for receiving the control signal(s) and responsively producing first desired position and velocity signals, second desired position and velocity signals, and third desired position and velocity signals. The present invention is flexibly suitable to work with a multitude of control systems, i.e., manual, automatic, or semi-automatic.

For example, in a semi-automatic control system, wherein linear movement of a point on the linkage along a prescribed trajectory is provided, a single control signal indicates the desired position and/or velocity of the point. In other systems or modes, manual or other automatic modes are provided.

The desired position and velocity signal producing means 302 receives the control signal(s) and according to the current mode of the control system, determines the desired position and velocity signals corresponding to the desired position and velocity of the respective linkages.

The controlling means 130 further includes a means 304 for receiving the desired position and velocity signals and the position and velocity signals, compares the respective signals, and responsively produces velocity and position error signals.

The controlling means 130 also includes a means 306 for receiving the position and velocity error signals and responsively determining the command signals.

The command signal determining means 306 includes a means for multiplying the position error signal by a first position transfer function, multiplying the first velocity error signal by a first velocity transfer function, multiplying the second position error signal by a second position transfer function, multiplying the second velocity error signal by a second velocity transfer function, and multiplying the third position error signal by a third position transfer function, and multiplying the third velocity error signal by a third velocity transfer function. The first command signal ($C_1$) is a function of the sum of the above products.

Figure 4:
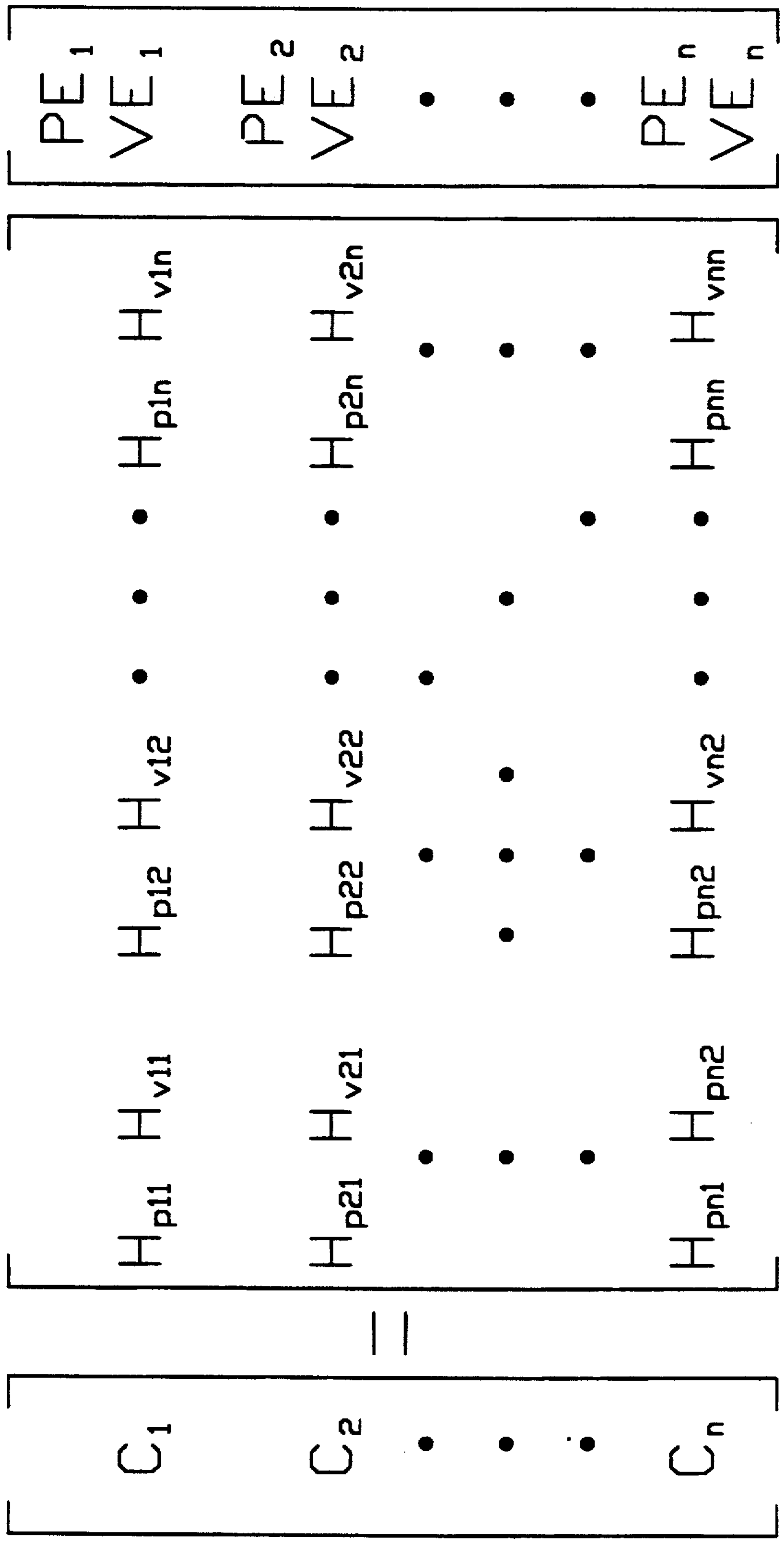
FIG. 4 is an equation used in the multivariable controlling means of FIG. 3.

Generally, the command signals for a work implement having n linkages are determined by the equation, which is also shown in FIG. 4:

$$\begin{bmatrix} C_1 \\ C_2 \\ \cdot \\ \cdot \\ C_n \end{bmatrix} = \begin{bmatrix} H_{p11} & H_{v11} & H_{p12} & H_{v12} & \cdots & H_{p1n} & H_{v1n} \\ H_{p21} & H_{v21} & H_{p22} & H_{v22} & \cdots & H_{p2n} & H_{v2n} \\ \cdot & & \cdot & \cdot & \cdot & & \cdot \\ \cdot & & \cdot & \cdot & \cdot & & \cdot \\ \cdot & & \cdot & \cdot & \cdot & & \cdot \\ H_{pn1} & H_{vn1} & H_{pn2} & H_{vn2} & \cdots & H_{pnn} & H_{vnn} \end{bmatrix} \begin{bmatrix} PE_1 \\ VE_1 \\ PE_2 \\ VE_2 \\ \cdot \\ \cdot \\ \cdot \\ PE_n \\ VE_n \end{bmatrix}$$

where, $C_1$ = the first command signal, $C_2$ = the second command signal, $C_n$ = the nth command signal, $PE_1$ = the first position error signal, $PE_2$ = the second position error signal, $PE_n$ = the nth position error signal, $VE_1$ = the first velocity error signal, $VE_2$ = the second velocity error signal, $VE_n$ = the nth velocity error signal, $H_{p11}, H_{v11}$ = the first position and velocity transfer functions for command $C_1$, $H_{p12}, H_{v12}$ = the second position and velocity transfer functions for command $C_1$, $H_{p1n}, H_{v1n}$ = the nth position and velocity transfer functions for command $C_1$, $H_{p21}, H_{v21}$ = the first position and velocity transfer functions for command $C_2$, $H_{p22}, H_{v22}$ = the second position and velocity transfer functions for command $C_2$, $H_{p2n}, H_{v3n}$ = the nth position and velocity transfer functions for command $C_2$, $H_{pn1}, H_{vn1}$ = the first position and velocity transfer functions for command $C_n$, $H_{pn2}, H_{vn2}$ = the second position and velocity transfer functions for command $C_n$, and $H_{pnn}, H_{vnn}$ = the nth position and velocity transfer functions for command $C_n$.

The transfer functions are dependent upon the linkage arrangement/specifications of the work implement and are synthesized based on emperical measurements of the linkage dynamics.

The control matrix (H) is derived from a system model consisting of:

1. linear transfer function models of the implement circuits's dynamic behaviour;
2. linear transfer function models describing the error or inacuracy of the implement circuit models as the linkage gemoetry hanges;
3. performance models describing the gain and bandwidth necessary to meet the required tracking accuracy performance; and
4. linear transfer function models describing the frequency characteristics of the (position and velocity) sensor noise.

The linear transfer models are based on emperical data and include coupling terms. The linear transfer models are derived using a dynamic signal analyzer. One suitable dynamic sugnal analyzer is the HP 3566A Dynamic Signal Analyzer available from Hewlett Packard of Palo Alto Calif. The performance models are dependent upon the desired system response accuracy. The sensor noise linear transfer models are determined in lab tests.

The system model defined by the above models is transformed to a state-space representation using standard coversion techniques. The state-space system (P) is partitioned as follows:

$$P = \left[\begin{array}{c|cc} A & B_1 & B_2 \\ \hline C_1 & D_{11} & D_{12} \\ C_2 & D_{21} & D_{22} \end{array}\right]$$

where, $X_1$ are the disturbance inputs, $X_2$ are the control inputs, $Y_1$ are the errors to be minimized and $Y_2$ are the output measurements provided to the controlling means 130.

The control matrix H is derived such that the tracking error between the commanded implement circuit hydraulic cylinder positions and velocities and actual cylinder positions and velocities. The control matrix H is derieved using the following procedure:

1. derive system model P;
2. synthesize an initial control matrix H;
3. if all performance objectives are met then the current control matrix H is used;
4. if all performance objectives are not met then P is scaled and control matrix H is re-synthesized;
5. steps 3–4 are repeated until all performance objectives are met.

In the preferred embodiment, control matrix H is synthesized using an H-infinity method. The H-infinity method is summaruzed in "State-space Solutions to Standard H2 and H-infinity Control Problems," by Doyle, J. C. et al., IEEE Transactions on Automatic Control, V1. 34, No. 8, August 1989, which is herein incorporated by reference.

In the preferred embodiment, the state-space system P is scaled by matrices obtained using an mu-analysis method. The mu-analysis method is disclosed in "Performance and Robustness Analysis for Structured Uncertainty," by Doyle, J. C. et al, IEEE Conference on Decision and Control, December 1982, pp. 629–636, which is herein incorporated by reference.

The general format of the transfer functions are as follows:

$$H_{ij} = \frac{K_{ij}(S + Z_1)(S + Z_2) \ldots (S + Z_m)}{(S + P_1)(S + P_2) \ldots (S + P_o)}$$

Industrial Applicability

With reference to the Figures and in operation, the present invention 102 is adapted to provide more stable and accurate control of the linkages comprising the work implement. For the purposes of discussion only, the present invention is described in relation to a hydraulic excavator. However, the present invention has equal applicability to a wide range of work implements. As a result, the present invention is not expressly limited to any such vehicle or linkage arrangement.

As discussed above, the present invention works equally well in a wide range of work implement control modes. For example, the work implement may be operated in a manual, semi-automatic or automatic mode. In a manual mode, an operator preferably requests movement of the linkages through a pair of electronic joysticks. The controlling means 130 receives the signals and the feedback signals. According to a set of rules defining the desired response characteristics (position, velocity) of the individual linkages the controlling means determines desired positions and velocities and subsequently position and velocity errors. The controlling means 130, as discussed above, filters the required error signals and determines individual command signals for each individual hydraulic circuit. The individual commands are functions of the position and velocity errors respective to all of the individual circuits. This allows the controlling means through the position and velocity transfer functions to effect the required movement and simultaneously to minimize the effect of crosstalk between the hydraulic circuits.

The present invention also works during semiautomatic or automatic modes. For example, linear motion of a point on the work implement, typically the end point of the bucket linkage, is provided in a semiautomatic mode controllable by an operator through a single control lever. Desired position and velocity signals for each linkage in the work implement are determined as a function of the control signal. Thereafter, the controller works similarly to that described above.

The transfer functions implemented by the controller are dependent upon the specifications of the work implement. The transfer functions are based on emperical measurements as discussed above.

Other aspects, objects, and features of the present invention can be obtained from a study of the drawings, the disclosure, and the appended claims.

We claim:

1. An apparatus for controllably actuating a work implement, the work implement having at least a first linkage and a second linkage, comprising:

means for producing a control signal;

means for sensing the position and velocity of the first linkage and responsively producing a first position signal and a first velocity signal;

means for sensing the position and velocity of the second linkage and responsively producing a second position signal and a second velocity;

controlling means for receiving said control signal, said first and second position signals and said first and second velocity signals and producing a first command signal ($C_1$) as a function of said control signal, said first and second position signals and said first and second velocity signals;

means for receiving said first command signal ($C_1$) and responsively actuating said first linkage as a function thereof; and wherein said first command signal is adapted to minimize dynamic coupling between the first actuating means and the second linkage.

2. An apparatus, as set forth in claim 1, wherein said control signal producing means includes a first control lever.

3. An apparatus, as set forth in claim 1, wherein said control signal producing means includes means for producing a second control signal.

4. An apparatus, as set forth in claim 3, wherein said control signal producing means includes first and second control levers.

5. An apparatus, as set forth in claim 4, wherein said first and second control levers are electronic joysticks.

6. An apparatus, as set forth in claim 1, wherein said first actuating means includes an electrohydraulic open center directional control valve.

7. An apparatus, as set forth in claim 1, wherein said first actuating means includes an open center directional control valve and an electrohydraulic pilot valve.

8. An apparatus, as set forth in claim 1, wherein said first actuating means includes an electrohydraulic closed center pressure compensated directional control valve.

9. An apparatus, as set forth in claim 1, wherein said first actuating means includes a closed center pressure compensated directional control valve and a electrohydraulic pilot valve.

10. An apparatus, as set forth in claim 1, including means for actuating the second linkage.

11. An apparatus, as set forth in claim 10, wherein said first and second actuating means are connected in series.

12. An apparatus, as set forth in claim 10, wherein said first and second actuating means are connected in parallel.

13. An apparatus, as set forth in claim 1, wherein said controlling means includes means for producing a second command signal ($C_2$) as a function of said control signal, said first and second position signals and said first and second velocity signals, and including means for receiving said second command signal ($C_2$) and responsively actuating said second linkage as a function thereof; and wherein said second command signal is adapted to minimize dynamic coupling between the second actuating means and the first linkage.

14. An apparatus, as set forth in claim 13, wherein said controlling means includes means for receiving said control signal and responsively producing a first desired position and velocity signals and second desired position and velocity signals.

15. An apparatus, as set forth in claim 14, wherein said controlling means includes means for receiving said first desired position and velocity signals, said second desired position and velocity signals, said and responsively producing first velocity and position error signals and second velocity and position error signals.

16. An apparatus, as set forth in claim 15, wherein said controlling means includes means for receiving said first position and velocity error signals and said second position and velocity error signals and responsively determining said first command signals.

17. An apparatus, as set forth in claim 16, wherein said first command signal is a function of a sum of the products of multiplying said first position error signal by a first position transfer function, multiplying said first velocity error signal by a first velocity transfer function, multiplying said second position error signal by a second position transfer function, and multiplying said second velocity error signal by a second velocity transfer function.

18. An apparatus for controllably actuating a work implement, the work implement having a first linkage, a second linkage, and a third linkage, comprising:

means for producing a control signal;

means for sensing the position and velocity of the first linkage and responsively producing a first position signal and a first velocity signal;

means for sensing the position and velocity of the second linkage and responsively producing a second position signal and a second velocity signal;

means for sensing the position and velocity of the third linkage and responsively producing a third position signal and velocity signal;

controlling means for receiving said control signal, said first, second, and third position signals and said first, second, and third velocity signals, producing a first command signal ($C_1$) as a function of said control signal, said first, second, and third position signals and said first, second, and third velocity signals, producing a second command signal ($C_2$) as a function of said control signal, said first, second, and third position signals and said first, second, and third velocity signals, and producing a third command signal ($C_3$) as a function of said control signal, said first, second, and third position signals and said first, second, and third velocity signals;

means for receiving said first command signal ($C_1$) and responsively actuating said first linkage as a function thereof;

means for receiving said second command signal ($C_2$) and responsively actuating said second linkage as a function thereof;

means for receiving said third command signal ($C_3$) and responsively actuating said third linkage (110) as a function thereof;

wherein said first command signal ($C_1$) is adapted to minimize dynamic coupling between the first actuating means and the second and third linkages;

wherein said second command signal ($C_2$) is adapted to minimize dynamic coupling between the second actuating means and the first and third linkages; and wherein said third command signal ($C_3$) is adapted to minimize dynamic coupling between the third actuating means and the first and second linkages.

19. An apparatus, as set forth in claim 18, wherein said control signal producing means includes a first control lever.

20. An apparatus, as set forth in claim 18, wherein said control signal producing means includes means for producing a second control signal.

21. An apparatus, as set forth in claim 20, wherein said control signal producing means includes first and second control levers.

22. An apparatus, as set forth in claim 21, wherein said first and second control levers are electronic joysticks.

23. An apparatus, as set forth in claim 18, wherein said controlling means includes means for receiving said control signal and responsively producing a first desired position and velocity signals, second desired position and velocity signals, and third desired position and velocity signals.

24. An apparatus, as set forth in claim 23, wherein said controlling means includes means for receiving said first desired position and velocity signals, said second desired position and velocity signals, said third position and velocity signals and responsively producing first velocity and position error signals, second velocity and position error signals, and third position and velocity error signals.

25. An apparatus, as set forth in claim 24, wherein said controlling means includes means for receiving said first position and velocity error signals, said second position and velocity error signals, said third position and velocity error signals and responsively determining said first, second and third command signals.

26. An apparatus, as set forth in claim 25, wherein said first command signal is a function of a sum of the products of multiplying said first position error signal by a first position transfer function, multiplying said first velocity error signal by a first velocity transfer function, multiplying said second position error signal by a second position transfer function, multiplying said second velocity error signal by a second velocity transfer function, multiplying said third position error signal by a third position transfer function, and multiplying said third velocity error signal by a third velocity transfer function; said second command signal is a function of a sum of the products of multiplying said first position error signal by a fourth position transfer function, multiplying said first velocity error signal by a fourth velocity transfer function, multiplying said second position error signal by a fifth position transfer function, multiplying said second velocity error signal by a fifth velocity transfer function, multiplying said third position error signal by a sixth position transfer function, and multiplying said third velocity error signal by a sixth velocity transfer function; and said third command signal is a function of a sum of the products of multiplying said first position error signal by a seventh position transfer function, multiplying said first velocity error signal by a seventh velocity transfer function, multiplying said second position error signal by an eighth position transfer function, multiplying said second velocity error signal by an eighth velocity transfer function, multiplying said third position error signal by a ninth position transfer function, and multiplying said third velocity error signal by a ninth velocity transfer function.

27. An apparatus for controllably actuating a work implement, the work implement having at least a first linkage and a second linkage, comprising:

means for producing first and second control signals;

means for sensing the position and velocity of the first linkage and responsively producing a first position signal and a first velocity signal;

means for sensing the position and velocity of the second linkage and responsively producing a second position signal and second velocity signal;

controlling means for receiving said first and second control signals, said first and second position signals and said first and second velocity signals and producing a first command signal ($C_1$) as a function of said first and second control signals, said first and second position signals and said first and second velocity signals;

means for receiving said first command signal ($C_1$) and responsively actuating said first linkage as a function thereof; and wherein said first command signal is adapted to minimize dynamic coupling between the first actuating means and the second linkage.

28. An apparatus for controllably actuating a work implement, the work implement having a first linkage, a second linkage, and a third linkage, comprising:

means for producing first and second control signals;

means for sensing the position and velocity of the first linkage and responsively producing a first position signal and a first velocity signal;

means for sensing the position and velocity of the second linkage and responsively producing a second position signal and a second velocity signal;

means for sensing the position and velocity of the third linkage and responsively producing a third position signal and a third velocity signal;

controlling means for receiving said first and second control signals, said first, second, and third position signals and said first, second, and third velocity signals, producing a first command signal ($C_1$) as a function of said first and second control signals, said first, second, and third position signals and said first, second, and third velocity signals, producing a second command signal ($C_2$) as a function of said first and second control signals, said first, second, and third position signals and said first, second, and third velocity signals, and producing a third command signal ($C_3$) as a function of said first and second control signals, said first, second, and third position signals and said first, second, and third velocity signals;

means for receiving said first command signal ($C_1$) and responsively actuating said first linkage as a function thereof;

means for receiving said second command signal ($C_2$) and responsively actuating said second linkage as a function thereof;

means for receiving said third command signal ($C_3$) and responsively actuating said third linkage as a function thereof;

wherein said first command signal ($C_1$) is adapted to minimize dynamic coupling between the first actuating means and the second and third linkages;

wherein said second command signal ($C_2$) is adapted to minimize dynamic coupling between the second actuating means and the first and third linkages; and wherein said third command signal ($C_3$) is adapted to minimize dynamic coupling-talk between the third actuating means and the first and second linkages.

29. An apparatus for controllably actuating a work implement on a work vehicle, the work implement having at least a first linkage and a second linkage, the work vehicle including means for producing a control signal and means for sensing the position and velocity of the first and second linkages and responsively producing first and second position signals and first and second velocity signals, comprising:

controlling means for receiving the control signal, said first and second position signals and said first and second velocity signals and producing a first command signal ($C_1$) as a function of the control signal, said first and second position signals and said first and second velocity signals;

means for receiving said first command signal ($C_1$) and responsively actuating said first linkage as a function thereof; and wherein said first command signal is adapted to minimize dynamic coupling between the first actuating means and the second linkage.

* * * * *